D. N. FLANDERS.
Carriage-Seat.
No. 14,231.
Patented Feb. 12, 1856.
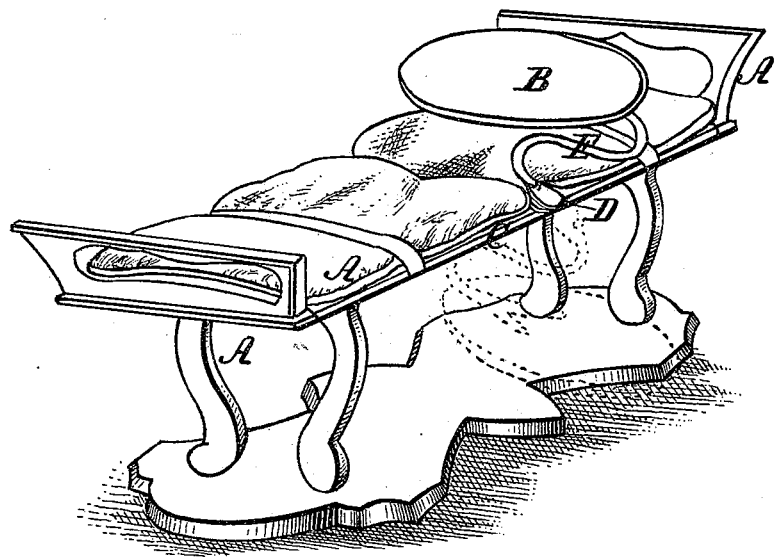
Witnesses:
John B. Durkee
Louisa D. Lee
Inventor:
David N. Flanders

UNITED STATES PATENT OFFICE.

DAVID N. FLANDERS, OF SOUTH ROYALTON, VERMONT.

ADJUSTABLE CARRIAGE-SEAT.

Specification of Letters Patent No. 14,231, dated February 12, 1856.

*To all whom it may concern:*

Be it known that I, D. N. FLANDERS, of South Royalton, county of Windsor, and State of Vermont, have invented a new and Improved Mode of Constructing the Seats for Carriages, of which the following description, illustrated by the accompanying drawing and references, is sufficiently clear and comprehensive to enable others of competent skill to make and use my invention.

The nature of my improvement consists in the manner in which I provide a second seat or stool for the driver of a carriage—viz., by hinging the leg of the said second seat to the bed piece of the main seat so that it may be revolved and the said driver's seat brought around under the ordinary seat when it is not required for use.

The drawing accompanying this specification is a perspective in which A is the common ordinary seat made to accommodate two persons and constructed in any of the forms now in use.

B is the additional seat for the driver attached to the bed C, by the hinges D upon the curved leg E. When the seat B is not required for use in the position shown in the drawing, it is let fall and assumes the position represented by the dotted lines—under the main seat, and is in this position entirely removed out of the way of the two persons who occupy the main seat.

What I claim as my invention is—

The additional revolving seat B hinged upon the bed piece so that it will turn and assume the two positions already described and thus make the carriage convenient for the accommodation of two or three passengers as desired.

DAVID N. FLANDERS.

Witnesses:
 JOHN B. DURKEE,
 LOUISE D. LEE.